US010198762B1

(12) United States Patent
Dangaltchev et al.

(10) Patent No.: US 10,198,762 B1
(45) Date of Patent: Feb. 5, 2019

(54) ORDERING SEARCH RESULTS TO MAXIMIZE FINANCIAL GAIN

(71) Applicant: Staples, Inc., Framingham, MA (US)

(72) Inventors: Tchavdar Dangaltchev, Bellevue, WA (US); Timothy Wee, Burlingame, CA (US); Karthik Kumara, Santa Clara, CA (US)

(73) Assignee: STAPLES, INC., Framingham, MA (US)

( * ) Notice: Subject to any disclaimer, the term of this patent is extended or adjusted under 35 U.S.C. 154(b) by 446 days.

(21) Appl. No.: 14/580,222

(22) Filed: Dec. 23, 2014

(51) Int. Cl.
*G06Q 30/00* (2012.01)
*G06F 17/30* (2006.01)
*G06Q 30/06* (2012.01)
*G06Q 30/02* (2012.01)

(52) U.S. Cl.
CPC ..... *G06Q 30/0625* (2013.01); *G06F 17/3053* (2013.01); *G06F 17/30554* (2013.01); *G06Q 30/02* (2013.01); *G06Q 30/0202* (2013.01); *G06Q 30/0601* (2013.01); *G06Q 30/0623* (2013.01)

(58) Field of Classification Search
None
See application file for complete search history.

(56) References Cited

U.S. PATENT DOCUMENTS

| 8,768,932 B1 | 7/2014 | Kacholia et al. |
| 2003/0046156 A1 | 3/2003 | Cromer et al. |
| 2008/0065463 A1* | 3/2008 | Rosenberg ............. G06Q 30/02 705/7.31 |
| 2011/0295716 A1* | 12/2011 | Dumon ............. G06F 17/30979 705/26.61 |
| 2012/0036037 A1* | 2/2012 | Xiao ...................... G06Q 30/00 705/26.7 |
| 2012/0059819 A1* | 3/2012 | Wheeler ........... G06F 17/30867 707/723 |
| 2013/0132226 A1 | 5/2013 | Abbas |
| 2013/0317946 A1 | 11/2013 | Mahajan et al. |

(Continued)

OTHER PUBLICATIONS

Wu, Prediction of the Intention of Purchase of the User Surfing on the Web Using Hidden Markov Model, Jan. 1, 2005, Proceedings of ICSSSM, vol. 1, p. 387-390.*

(Continued)

*Primary Examiner* — William J Allen
*Assistant Examiner* — Timothy J Kang
(74) *Attorney, Agent, or Firm* — Patent Law Works LLP

(57) ABSTRACT

Technology for determining the order of the search results to maximize a financial goal is described. In an example embodiment, a method, implemented using the one or more computing devices, such as client and/or server devices, may receive a product search request from a user device associated with a user and retrieve a set of products from a product database based on the product search request. Based on a purchase probability and one or more of a margin and a price for that product, the method determines an expected financial gain for each of the products of the set and sorts the set of products into an ordered set of products having an order based on the expected financial gain associated with each of the products. The method may then provide the ordered set of products for display to the user on the user device.

19 Claims, 14 Drawing Sheets

(56) References Cited

U.S. PATENT DOCUMENTS

2014/0089046 A1* 3/2014 Sullivan ........... G06Q 10/06398
705/7.31
2014/0297630 A1 10/2014 Cao et al.
2015/0363805 A1* 12/2015 Tibau-Puig ........ G06Q 30/0206
705/7.35

OTHER PUBLICATIONS

Poel, Predicting Online-Purchase Behaviour, Oct. 16, 2005, European Journal of Operational Research, vol. 166, p. 557-575.*
Moe, Buying, Searching, or Browsing: Differentiating Between Online Shoppers Using In-Store Navigational Clickstream, 2003, Journal of Consumer Psychology, vol. 13, p. 29-39.*
Poel, Predicting Online-Purchase Behaviour, Oct. 16, 2008, European Journal of Operational Research, vol. 166, p. 557-575.*

* cited by examiner

|     | 800 |     | 802 | 804 | 806 |
|-----|-----|-----|-----|-----|-----|
| Product #1 | | | 0 | 1 | 2 |
| Price | | | $10 | $9 | $8 |
| Quantity Sold | | | 100 | 200 | 210 |
| Margin | | | $4 | $3 | $2 |
| Total Revenue | | | $1,000 | $1,800 | $1,680 |
| Total Profit | | | $400 | $600 | $420 |

Figure 8A

| 830 | 832 | 834 |
|-----|-----|-----|
| Product #2 | 0 | 3 |
| Price | $50 | $40 |
| Quantity Sold | 20 | 30 |
| Margin | $20 | $10 |
| Total Revenue | $1,000 | $1,200 |
| Total Profit | $400 | $300 |

| #1 | #2 | Combined 866 | Profit | Revenue |
|----|----|----|--------|---------|
| 0 | 0 | 0 | $800 | $2,000 |
| 1 | 0 | 1 | $1,000 | $2,800 |
| 2 | 0 | 2 | $820 | $2,680 |
| 0 | 3 | 3 | $700 | $2,200 |
| 1 | 3 | 4 | $900 | $3,000 |
| 2 | 3 | 5 | $720 | $2,880 |

ORDERING SEARCH RESULTS TO MAXIMIZE FINANCIAL GAIN

BACKGROUND

The present specification generally relates to the field of optimizing the order of search results to maximize a financial gain.

The use of the internet to promote and sell products has proliferated in recent years to the point where it has become a significant portion of retail sales. While retailers commonly allow customers to sort products based on prices and other characteristics, the order of the products is generally sorted by popularity, price, location, match to customer, etc. Sorting products in this way fails to optimize the sale opportunity to that customer because the customer is generally presented with products in an order that does not bear the potential of generating an optimal financial outcome for the merchant.

SUMMARY

According to one innovative aspect of the subject matter described in this disclosure, an example method, implemented using the one or more computing devices, such as client and/or server devices, may receive a product search request from a user device associated with a user and retrieve a set of products from a product database based on the product search request. Based on a purchase probability and one or more of a margin and a price for that product, the method determines an expected financial gain for each of the products of the set and sorts the set of products into an ordered set of products having an order based on the expected financial gain associated with each of the products. The method may then provide the ordered set of products for display to the user on the user device.

Other innovative aspects include corresponding systems, methods, apparatus, and computer program products are also described. It should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

FIGS. 8A through 8C illustrate tables depicting example pricing strategies and strategy combinations.

FIGS. 11 and 12 are example graphical user interfaces showing sets of products sorted according to the present disclosure.

DETAILED DESCRIPTION

Figure 1A:
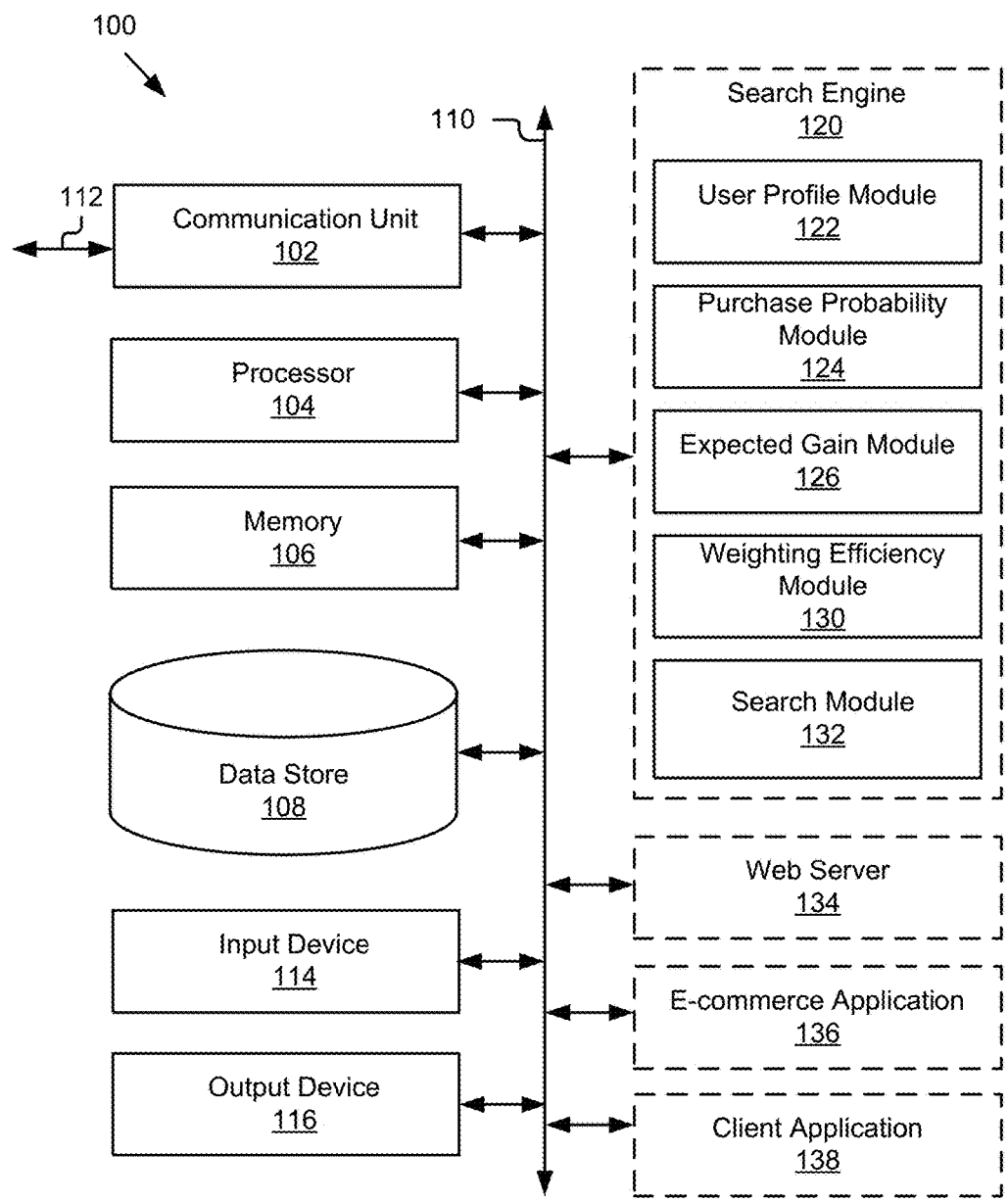
FIG. 1A is a block diagram of an example computing system.
Figure 13:
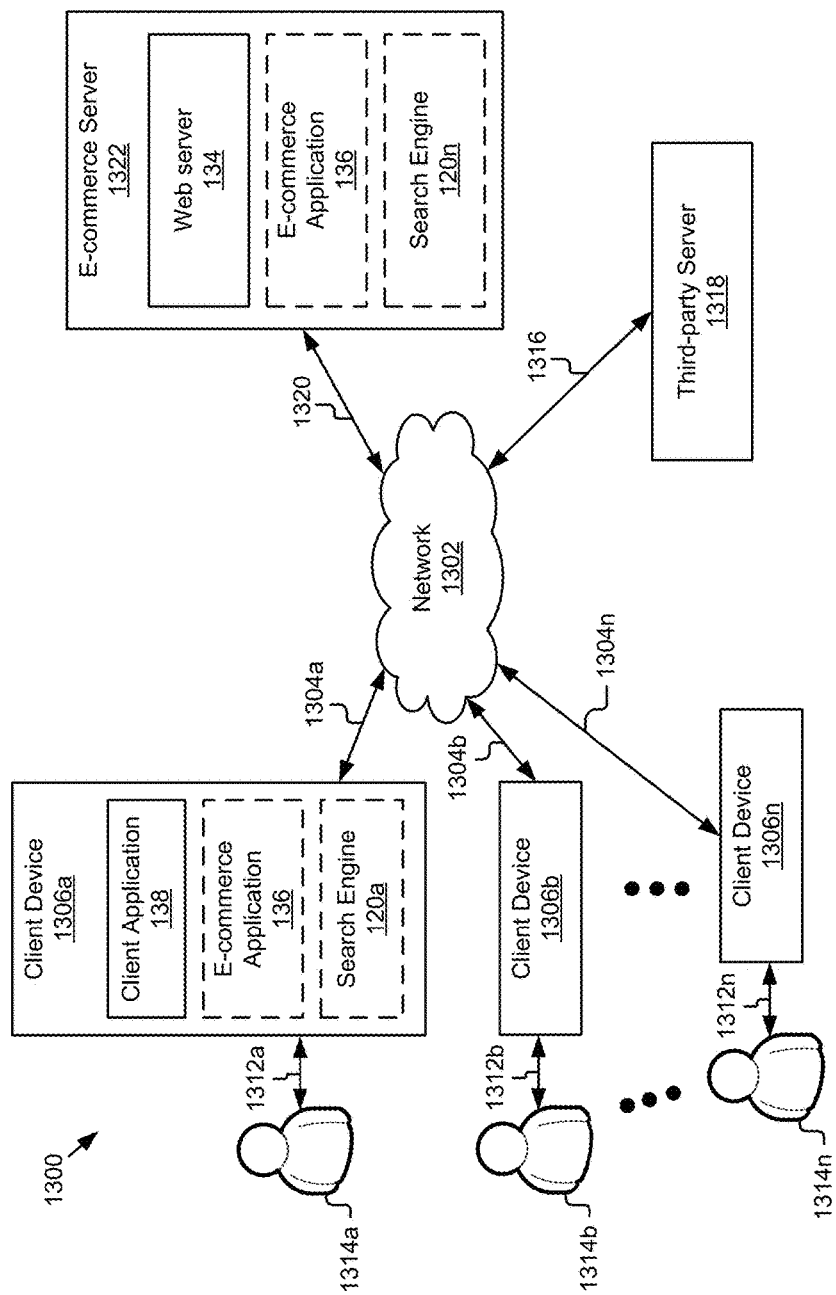
FIG. 13 is a block diagram illustrating an example system for ordering search results to maximize gain.

FIG. 1A is a block diagram of an example computing system 100, which may represent the computer architecture of a client device 1306, a third-party server 1318, and/or an e-commerce server 1322, as depicted in FIG. 13, depending on the implementation.

As depicted in FIG. 1A, the computing system 100 may include a search engine 120, a web server 134, an e-commerce application 136, and a client application 138, depending on the configuration. For instance, a client device 1306 may include one or more of the client application 138, the e-commerce application 136, the search engine 120, and/or components thereof; and the e-commerce server 1322 may include the web server 120, the e-commerce application 136, the search engine 120, and/or components thereof, although other configurations are also possible and contemplated.

The search engine 120 includes computer logic executable by the processor 104 to order search results to maximize a financial gain, such as profit and/or revenue. The search engine 120 is coupled to the data store 108 to store, retrieve, and/or manipulate data stored therein and may be coupled to the e-commerce application 136, the web server 134, the client application 138, and/or other components of the system 100 to exchange information therewith.

In the depicted implementation, the search engine 120 includes a user profile module 122, a purchase probability module 124, an expected gain module 126, a weighting efficiency module 130, and a search module 132.

The user profile module 122 may include computer logic executable by the processor 104 to manage user profiles for the users of the system 100. The user profile module 122 may track and accumulate user profile data specific to users and/or classes of users. The user profile module 122 may receive user-related information from various information sources (e.g., the e-commerce application 136, or the web server 134, the client application 138, etc.) and store that information as user profile data 148 in association with the users to which the data corresponds. In some implementations, the user profile module 122 may method interaction data associated with a given user to determine attributes about the user (e.g., products and or product categories the user likes, discount types that are effective for that user, etc.) and may store those attributes as user profile data 148 in the data store 108.

In some implementations, users may manage their user profiles using interfaces presented by corresponding client applications 138. Modifications may be received by the web server 134 and relayed to the user profile module 122, which may update the user profile in the data store 108.

The purchase probability module 124 may include computer logic executable by the processor 104 to determine the probability that a user will purchase a product (e.g., on average, under certain circumstances, etc.). The purchase probability module 124 may communicate with the other components of the search engine 120 and/or store data in the data store 108. In some implementations, the purchase probability module 124 calculates a purchase probability based on past purchase information. For example, the purchase probability module 124 may track (or receive tracking information, for example from other components of the computing system 100 or the system 1300) page views for particular products as well as the frequency with which those page views are converted into completed sales and use that information to calculate a purchase probability (e.g., if a product is purchased 20 times for every 2000 views, then the purchase probability would be 1%).

In some implementations, the purchase probability module 124 may update a purchase probability for a particular product or user dynamically, periodically, or in response to a trigger. For example, the purchase probability module 124 may update a purchase probability for a user in response to receiving a product search request from the user. In another example, the purchase probability module 124 may update a purchase probability for a product each morning, each week, or after a time period during which the purchase probability for the product is experimentally evaluated.

In some implementations, the purchase probability module 124 may receive a search query (e.g., from the e-commerce application) and use the attributes of that search query along with the attributes of a particular product in the search results to determine a probability. For example, the purchase probability module 124 may assign a greater probability to a product which perfectly matches a search request (as used herein, search request may also include a search query, for ease of explanation).

In an example implementation the exactness of a match affecting the purchase probability of one or more products can be seen in the following scheme, ordered from matches (e.g., matches between the search request and the attributes of a product) with a greatest impact on purchase probability to least impact on purchase probability: specific product (e.g., make, model, product number), specific brand, classes of products (e.g., printers, paper, computers, etc.), subclasses of products (e.g., laser printers, laptops, linen paper, etc.)

In some implementations, the purchase probability module 124 uses analytics data 140, product data 142, and or user profile data 148 containing purchase probabilities for particular circumstances (e.g., for a particular user, a particular product, a particular class of products, a particular date, time, operating system of the user device 1306, geographic location, user device 1306 type, etc.) and classifies a current user based on that user's attributes. In an illustrative example, the purchase probability module 124 receives user profile data from the user profile module 122, uses it to determine purchase probability, and sends the purchase probability to the expected gain module 126 for further processing. In another illustrative example, the purchase probability module 124 retrieves web analytics data 140, user profile data 148, and product data 142 from the data store 108, uses these data types to calculate a purchase probability, and stores the probability in the in the data store 108 for access by other components of the search engine 120.

It should be understood that other configurations are possible and contemplated. Additional structure, acts, and/or functionality of the purchase probability module 124 may be described elsewhere herein at least with reference to FIGS. 3-5 and 7-8C.

The expected gain module 126 may include computer logic executable by the processor 104 to determine an expected profit and/or expected revenue (also referred to herein as simply profit or revenue, respectively) using purchase probability data (e.g., received from the purchase probability module 124 or stored in the product data 142, the user profile data 148, etc.). The expected gain module 126 may be coupled for communication with the other modules of the search engine 120 and to the data store 108 to store, update, and retrieve data. For example, the expected gain module 126 may receive weighting information from the weighting efficiency module 130 and/or retrieve purchase probability data (e.g., from the product data 142 or user profile data 148), price data 146, and/or product data 242, and use them to calculate the expected profit for particular products or bundles of products.

The expected gain module 126 may provide its output to the weighting efficiency module 130, the search module 132, and/or may store the data in the data store 108 as product data 142 and/or price data 146. Additional structure, acts, and/or functionality of the computation module 324 may be described elsewhere herein at least with reference to FIGS. 2, 4, 5, 7, and 9-12.

The weighting efficiency module 130 may include computer logic executable by the processor 104 to determine a weighting (e.g., a ratio or a vector) for an expected gain (e.g., a financial outcome such as profit, revenue, total sales, etc.) using data received from the e-commerce application 136, other components of the search engine 120 or computing system 100, or retrieved from the data store 108. The weighting efficiency module 130 may be coupled for communication with the web server 134, the e-commerce application 136, and/or the other modules of the search engine 120, and may be coupled to the data store 108 to store, update, and retrieve data. For example, the weighting efficiency module 130 may receive analytics data 140, product data 142, business objective data 144, etc., and use them to calculate weightings for expected gains and or an efficient frontier. Additional structure, acts, and/or functionality of the weighting efficiency module 130 may be described elsewhere herein at least with reference to FIG. 7.

The search module 132 may include computer logic executable by the processor 104 to retrieve search results based on a search request and determine an order for a set of products embodied in the search results. The search module 132 may be coupled for communication with the web server 134, the e-commerce application 136, and/or the other modules of the search engine 120, and coupled to the data store 108 to store, update, and retrieve data. For example, the search module 132 may retrieve product data 142, business objective data 144, price data 146, and/or user profile data 148 for sorting the set of products. An example order for the set may be an ordered set of products with an order based on the purchase probabilities, margins and revenues, company goals, and/or other requirements. Additional structure, acts, and/or functionality of the search module 132 is described elsewhere herein at least with reference to FIGS. 2 and 10-12.

The web server 134 includes computer logic executable by the processor 104 to methods content requests. The web server 134 may include an HTTP server, a REST (representational state transfer) service, or other suitable server type. The web server 134 may receive content requests (e.g., product search requests, HTTP requests) from client devices 1306, cooperate with the e-commerce application 136 and/or search engine 120 to determine the content, retrieve and incorporate data from the data store 108, format the content, and provide the content to the client devices.

In some instances, the web server 134 may format the content using a web language and provide the content to a corresponding client application 138 for processing and/or rendering to the user for display.

The web server 134 may be coupled to the data store 108 to store retrieve, and/or manipulate data stored therein and may be coupled to the e-commerce application 136 to facilitate its operations. For example, the web server 134 may allow a user on a client device 1306 to communicate with the e-commerce application 136 and/or search engine 120.

The e-commerce application 136 includes computer logic executable by the processor 104 to provide an e-commerce service/marketplace for various products and may store and provide access to product information (e.g., images, descriptions, categories, specifications, reviews, ratings, retailers, etc.) in the product data 142 in a data store 108. The e-commerce application 136 may also place and provide for order fulfillment for the products including order delivery status and item returns. For example, a user may place orders for and/or pay for products, such as office supplies, consumer electronics, other products, etc., ordered on an e-commerce marketplace using a client device 1306.

The e-commerce application 136 may also receive, manage, analyze, store, and provide access to inventory, sales, rewards, and product data. The e-commerce application 136 may communicate with the search engine 120 and the web server 134 to facilitate their operations and may be coupled to the data store 108 to store retrieve, and/or manipulate data stored therein. For example, the e-commerce application 136 may retrieve product data from a third-party server 1318 and store it in the product data 142.

Figure 10:
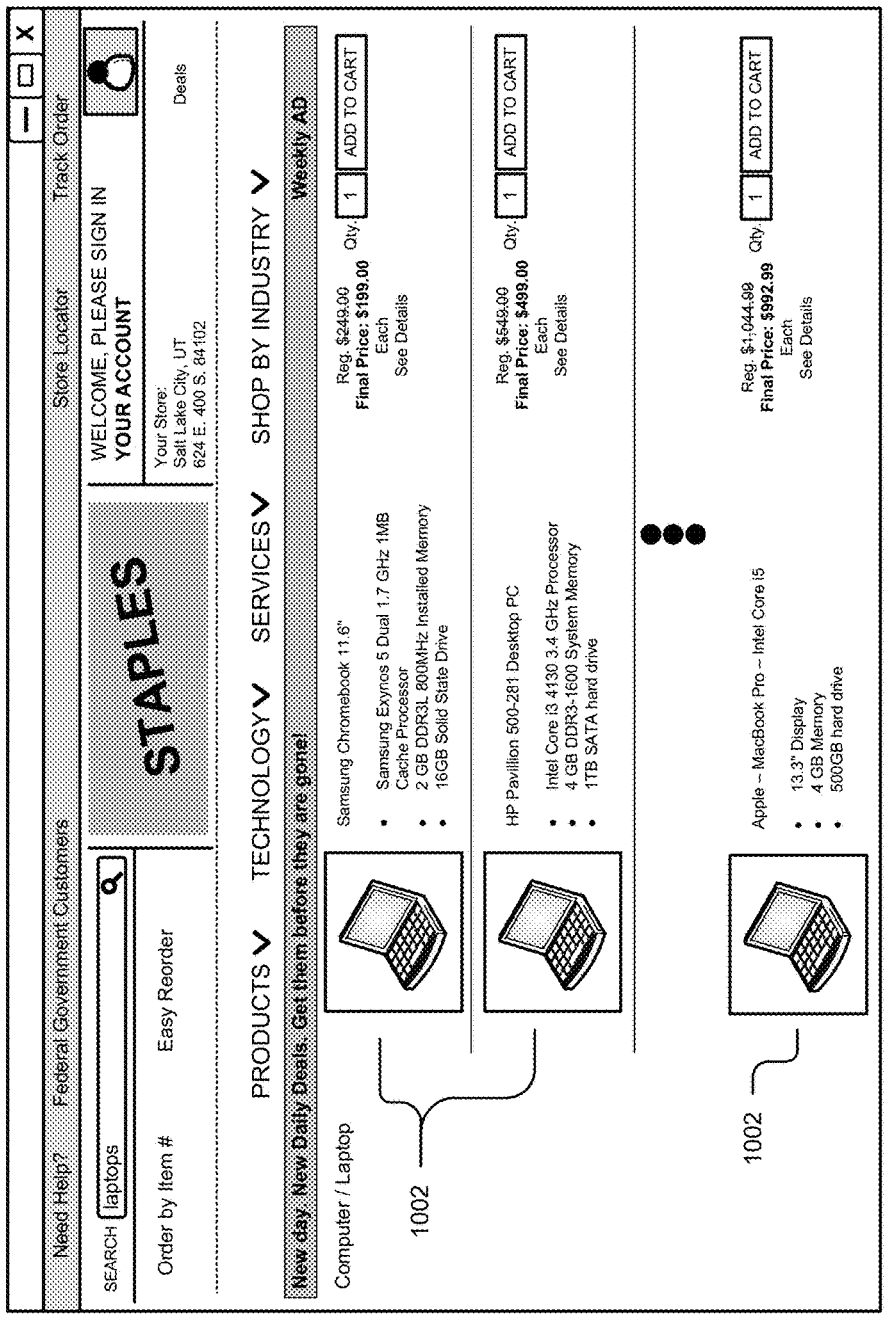
FIG. 10 is an example graphical user interface showing sets of products sorted according to a conventional method.
Figure 11:
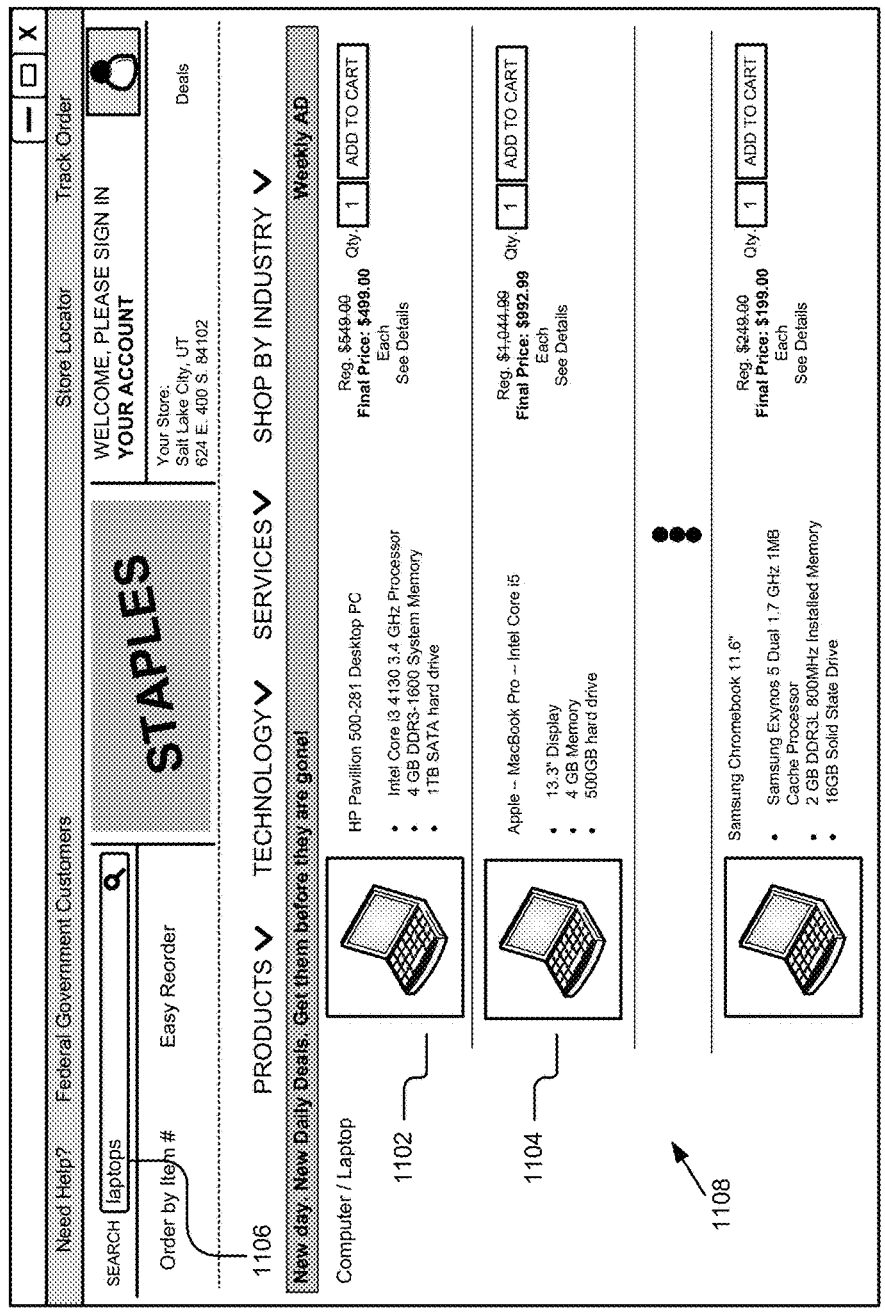
Figure 12:
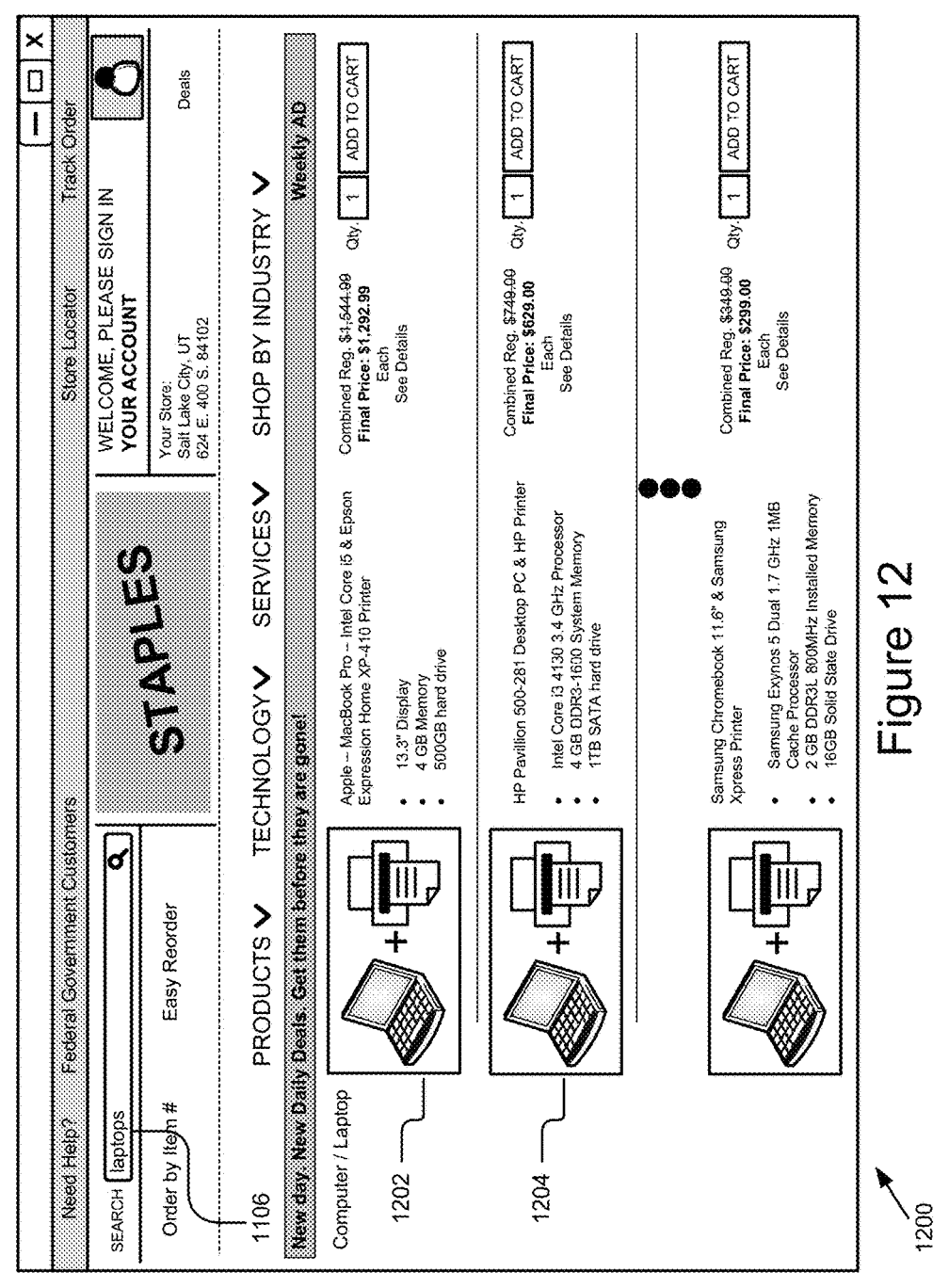

The client application 138 includes computer logic executable by the processor 104 on a client device 1306 to provide for user interaction, receive user input, present information to the user via a display, and send data to and receive data from the other entities of the system 1300 via the network 1302. In some implementations, the client application 138 may generate and present user interfaces based at least in part on information received from the e-commerce application 136 and/or the web server 134 via the network 1302. For example, a customer/user 1314 may use the client application 138 to receive the product pages provided by the e-commerce server 1322, view various products available online, add products to a virtual cart, purchase products, receive discounts on products, etc. In some implementations, the client application 138 includes a web browser and/or code operable therein, a customized client-side application (e.g., a dedicated mobile app), a combination of both, etc. An example webpage showing a set of products, which can be selected to view product pages, is shown in FIGS. 10-12.

As depicted, the computing system 100 may include a processor 104, a memory 106, a communication unit 102, an output device 116, an input device 114, and a data store 108, which may be communicatively coupled by a communication bus 110. The computing system 100 depicted in FIG. 1A is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 100 may include various operating systems, sensors, additional processors, and other physical configurations. Although, for purposes of clarity, FIG. 1A only shows a single processor 104, memory 106, communication unit 102, etc., it should be understood that the computing system 100 may include a plurality of one or more of these components.

The processor 104 may execute software instructions by performing various input, logical, and/or mathematical operations. The processor 104 may have various computing architectures to method data signals including, for example, a complex instruction set computer (CISC) architecture, a reduced instruction set computer (RISC) architecture, and/or an architecture implementing a combination of instruction sets. The processor 104 may be physical and/or virtual, and may include a single core or plurality of processing units and/or cores. In some implementations, the processor 104 may be capable of generating and providing electronic display signals to a display device, supporting the display of images, capturing and transmitting images, performing complex tasks including various types of feature extraction and sampling, etc. In some implementations, the processor 104 may be coupled to the memory 106 via the bus 110 to access data and instructions therefrom and store data therein. The bus 110 may couple the processor 104 to the other components of the computing system 100 including, for example, the memory 106, the communication unit 102, the input device 114, the output device 116, and the data store 108.

The memory 106 may store and provide access to data to the other components of the computing system 100. The memory 106 may be included in a single computing device or a plurality of computing devices. In some implementations, the memory 106 may store instructions and/or data that may be executed by the processor 104. For example, the memory 106 may store one or more of a search engine 120, a web server 134, an e-commerce application 136, a client application 138, and their respective components, depending on the configuration. The memory 106 is also capable of storing other instructions and data, including, for example, an operating system, hardware drivers, other software applications, databases, etc. The memory 106 may be coupled to the bus 110 for communication with the processor 104 and the other components of computing system 100.

The memory 106 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 104. In some implementations, the memory 106 may include one or more of volatile memory and non-volatile memory (e.g., RAM, ROM, hard disk, optical disk, etc.). It should be understood that the memory 106 may be a single device or may include multiple types of devices and configurations.

The bus 110 can include a communication bus for transferring data between components of a computing device or between computing devices, a network bus system including the network 1302 or portions thereof, a processor mesh, a combination thereof, etc. In some implementations, search engine 120, web server 134, e-commerce application 136, client application 138, and various other components operating on the computing device 100 (operating systems, device drivers, etc.) may cooperate and communicate via a communication mechanism included in or implemented in association with the bus 110. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 102 may include one or more interface devices (I/F) for wired and wireless connectivity among the components of the system 1300. For instance, the communication unit 102 may include, but is not limited to, various types known connectivity and interface options. The communication unit 102 may be coupled to the other components of the computing system 100 via the bus 110. The communication unit 102 may be coupled to the network 1302 as illustrated by the signal line 112, depending on the configuration. In some implementations, the communication unit 102 can link the processor 104 to the network 1302, which may in turn be coupled to other processing systems. The communication unit 102 can provide other connections to the network 1302 and to other entities of the system 1300 using various standard communication protocols.

The input device 114 may include any device for inputting information into the computing system 100. In some implementations, the input device 114 may include one or more peripheral devices. For example, the input device 114 may include a keyboard, a pointing device, microphone, an image/video capture device (e.g., camera), a touch-screen display integrated with the output device 116, etc.

The output device 116 may be any device capable of outputting information from the computing system 100. The output device 116 may include one or more of a display (LCD, OLED, etc.), a printer, a 3D printer, a haptic device, audio reproduction device, touch-screen display, etc. In some implementations, the output device is a display which may display electronic images and data output by the computing system 100 for presentation to a user 106. In some implementations, the computing system 100 may include a graphics adapter (not shown) for rendering and outputting the images and data for presentation on output device 116. The graphics adapter (not shown) may be a separate processing device including a separate processor and memory (not shown) or may be integrated with the processor 104 and memory 106.

The data store 108 is an information source for storing and providing access to data. The data stored by the data store 108 may organized and queried using various criteria including any type of data stored by them, such as a customer identifier, IP address, rewards account number, product identifier, product attributes, product name, where products were purchased from, etc. The data store 108 may include data tables, databases, or other organized collections of data. Examples of the types of data stored by the data store 108 may include, but are not limited to, analytics data 140, product data 142, business objective data 144, price data 146, user profile data 148, etc., as discussed elsewhere herein, for example, in reference to FIG. 1B.

The components 120, 134, 136, 138, and/or components thereof (e.g., 122, 124, 126, 130, and/or 132), may be communicatively coupled by the bus 110 and/or the processor 104 to one another and/or the other components 102, 106, 108, 114, and 116 of the computing system 100. In some implementations, the components 120, 134, 136, and/or 138 may include computer logic (e.g., software logic, hardware logic, etc.) executable by the processor 104 to provide their acts and/or functionality. In any of the foregoing implementations, these components 120, 134, 136, and/or 138 may be adapted for cooperation and communication with the processor 104 and the other components of the computing system 100.

The data store 108 may be included in the computing system 100 or in another computing system and/or storage system distinct from but coupled to or accessible by the computing system 100. The data store 108 can include one or more non-transitory computer-readable mediums for storing the data. In some implementations, the data store 108 may be incorporated with the memory 106 or may be distinct therefrom. In some implementations, the data store 108 may store data associated with a database management system (DBMS) operable on the computing system 100. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Figure 1B:
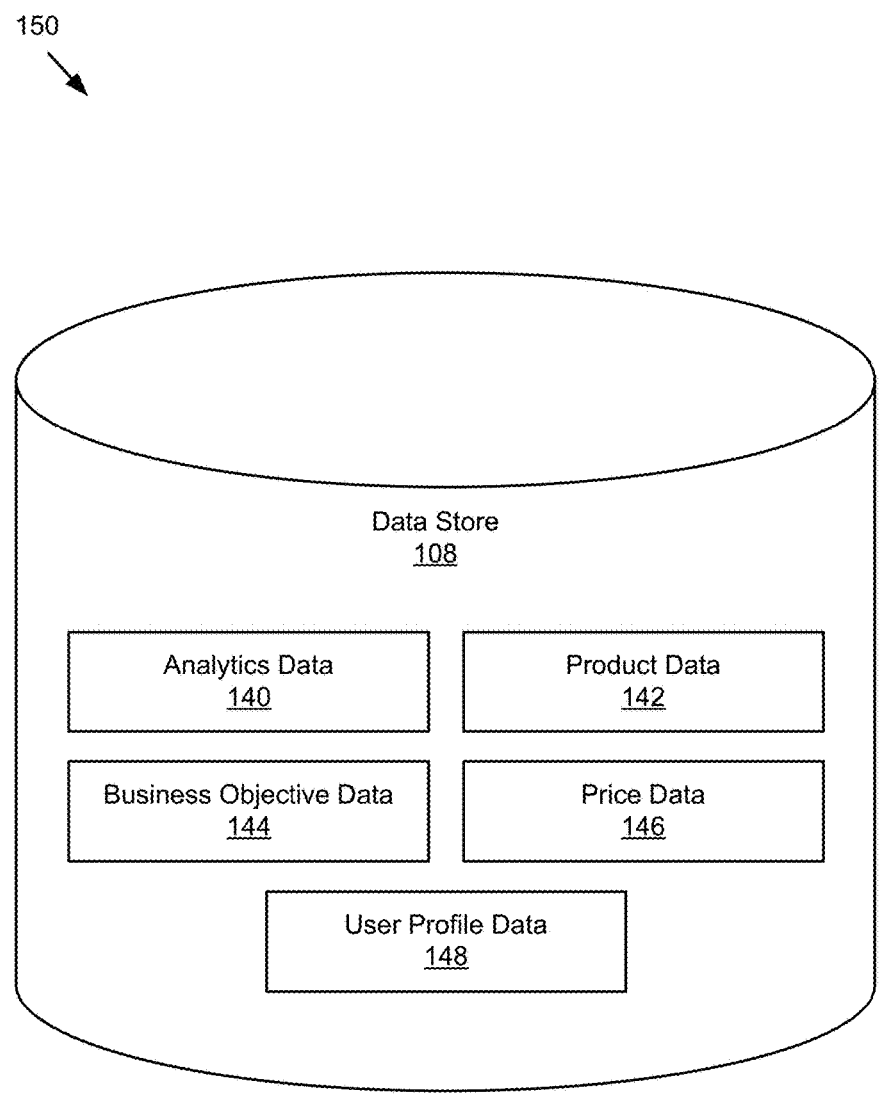
FIG. 1B is a block diagram of an example data store.

FIG. 1B is a block diagram 150 of the data store 108, and is depicted as storing analytics data 140, product data 142, business objective data 144, price data 145, and user profile data 148, although the data store 108 is not limited to such and can store and provide access to other types of data.

Analytics data 140 may include past behavior data describing the past actions of a customer, such as accessing, entering, interacting with, and leaving interfaces associated with the services provided by the e-commerce server 1322, the third-party server 1318, and/or other components of the system. For example but not limitation, the analytics data 140 may include the clickstream path of a user, the geolocation history and/or current geolocation of a user, data segmentation by user attribute (e.g., demographics such as gender, ethnicity, age, interest, entry point, user device, user application, product preference, classification, etc.), the browsing history associated with a product or class of products visited by a user, etc.

The analytics data 140 may be aggregated from one or more information sources (e.g., the third-party server 1318, the client device(s) 1306, etc.) by the e-commerce server 1322. For example, the information sources may store and provide web analytics data such as web server access logs, user application usage logs, cookies, any real-time interaction data acquired by client and/or server-side modules (e.g., received from a client-side user tracking module, such as a tracking module implemented using JavaScript, a server log, etc.) in real-time or near real-time associated with the current or recent actions of a customer in association with an interface (e.g., user's identity and/or current on-site or in-app behavior, such as referrer, selections, items in cart, path, elements clicked, information typed, items hovered over, searches made, etc.). In another example, the client application 138 and/or the web server 134 may track user interactions/behavior on the client device 1306 and store the user interactions as analytics data 140. In some implementations, the analytics data 140 may include timestamps associated with each action taken by the users when interacting with the application interfaces, as well as user identifiers (e.g., IDs, IP addresses, MAC addresses, etc.) associated with the users and/or the user devices 1306 of the users 1314.

The analytics data 140 may conversion data, such as reflecting each step of a typical sales funnel for each product. For instance, for a given product, the analytics data 140 associated with that product may describe the number of users who viewed an interface featuring that product for sale, the number of users that added the product to a virtual shopping cart responsive to receiving a discount, the number of users that began the checkout process, the number of users that did or did not complete the checkout process, or any other dimension. The analytics data 140 may be linked to other types of data in the data store 108, for example 142, 144, 146, and 148.

Product data 142 may include data and attributes concerning one or more products, product classes, categories, product hierarchies, etc. Non-limiting examples of products includes office supplies, electronics, furniture, consumables, clothing, and/or any other consumer or business products. The product data 142 includes a plurality of product records respectively describing products available via the e-commerce application 136. Each product record may describe the various aspects of the products. Each record may include one or more product attributes characterizing the product. Each record may also include unique product identifiers, names, descriptions, manufacturer info, specifications, photos, videos, reviews, ratings, categories, etc. for products.

The product data 140 may be correlated with the other types of data in the data store 108, for example 140, 144, 146, and 148. For instance, the analytics data 140 may include information about a particular product, such as the frequency that a particular product is viewed by a user or class of users, the popularity of the product or a brand, etc. The product data 142 may be correlated with the price data 146 to associate current and past offered price information (e.g., margins, prices, quantity of sales, etc.) of a product to the product or an attribute of the product. The product data 142 may be accessible by other components of the system 1300. For example, the e-commerce application 136 and/or web server 134 may retrieve product data 142 for a particular product for display to a user on a client device 1306. In another example, the expected gain module 126 may retrieve a margin for a particular product.

Business objective data 144 may include data pertaining to company goals of a business or other entity. In some implementations, the company goals may include strategies or choices of strategies, such as those described in data points 906 in FIG. 9A. A strategy may be input (e.g., predetermined) by an administrator or selected from a set of strategies or strategy combinations. In some implementations, the company goals and/or strategies may include a desired gain, such as a ratio of a profit weight to a revenue weight. For example, a business goal may be to maximize either the profit or revenue on a specific product, on a set of products, or over an entire inventory. In another example, the business goal can be to set a ratio of profit to revenue (e.g., profit is 60% important to the company and revenue is 40% important to the company). In yet another example, a company goal may be to achieve a certain amount of profit (e.g., $5 million) while maximizing revenue. In a final example, a company goal may be to focus on a total number of sales regardless of profit or revenue (e.g., to sell more products than would necessarily increase revenue or profit to increase market share).

Price data 146 may include data pertaining to the pricing of a particular product or class of products and may be correlated with other data in the data store 108, such as the product data 142. In some implementations, the price data 146 includes a history of past offers, retail prices (e.g., MSRP), average sale prices on one or more competitive websites, profit margins (e.g., a sales price less the cost of good/the product), wholesale product costs, etc. The price data 146 may be updated dynamically in response to a product being retrieved in response to a product search request, periodically (e.g., hourly, daily, weekly, etc.), or in response to other triggers (e.g., the beginning of a sale).

The user profile data 148 may include profiles for each of the users 1314 of the system 1300. The user profile data 148 may be correlated with the other types of data in the data store 108, for example 140, 142, 144, and 146. A given user's profile may include the user's user account and attributes describing the user. The user account may include information associated with the user's identity on the services provided by the e-commerce server 1322, such as a username, password, preference data, payment information, etc. The attributes may characterize the user's preferences and/or identity. User attributes may be based on information provided by the user or information learned from user interactions with the system 1300. Non-limiting examples of user attributes include an e-mail address, IP address, demographics data, spending potential, gender, whether a user is a consumer or a business, location data, user id, rewards account number, products of interest or potentially of interest to the user, product purchase history, devices registered to the user, age, ethnicity, marital status, etc. In a further example, the user profile data 148 may include a user classification scheme and may classify user's based on attributes. The classifications to which a given user is classified into may be stored in the user's profile data 148 as attributes describing that user.

In some implementations, the user profile data 148 may include purchase probability data describing the probability that users or a class of users will purchase the particular product (e.g., at particular prices, retail prices, various discounted prices, etc.). The purchase probability data may be learned from past offers to sell products. For example, the purchase probability module 126 may determine the purchase probability for a product and store it as product data 142, as described elsewhere herein. In some implementations, the purchase probability data may include predicted probabilities corresponding to certain attribute triggers. For example, the purchase probability data may include that a person who frequents webpages associated with a certain product will have a 10% probability to purchase the product at a given price. In another example, the purchase probability data may include that a particular product is purchased upon 20% of the page views associated with that product.

The methods 200-700 depicted in FIGS. 2-7, respectively are now described. However, it should be understood that the methods 200-700 are provided by way of example, and that variations and combinations of these methods, as well as other methods, are contemplated. For example, in some embodiments, at least a portion of one or more of the methods 200-700 represent various segments of one or more larger methods and may be concatenated or various steps of these methods may be combined to produce other methods which are encompassed by the present disclosure. Additionally, it should be understood that various operations in the methods 200-600 and 700 are iterative, and thus repeated as many times as necessary generate the results described herein. Further the ordering of the operations in the methods 200-600 and 700 is provided by way of example and it should be understood that various operations may occur earlier and/or later in the method without departing from the scope thereof.

Figure 2:
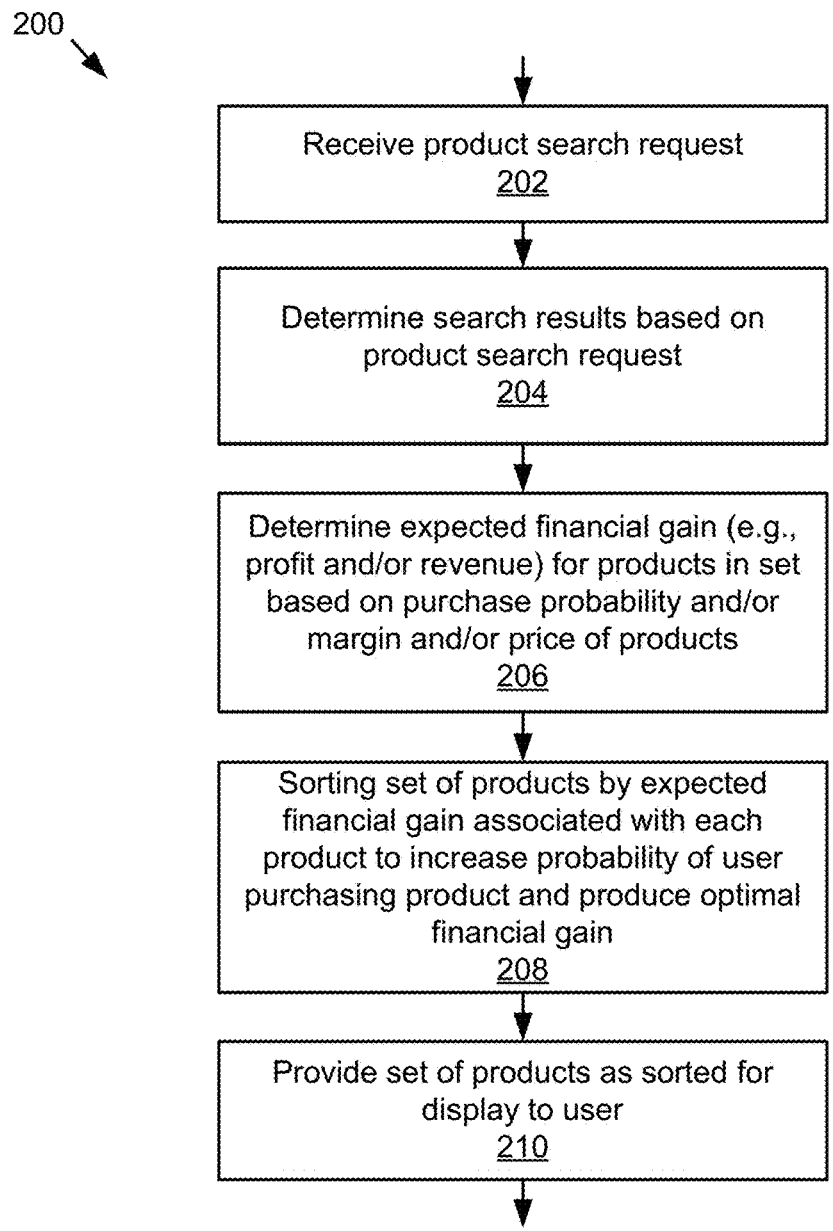
FIG. 2 is a flowchart illustrating an example method for ordering search results to maximize gain.

FIG. 2 is a flowchart of an example method 200 for ordering search results to maximize a financial gain, such as profit and/or revenue. In block, 202 the method 200 receives a product search request from a client application 138 and determines a set of search results based on the search request. In some implementations, the web server 134 may receive the product search request from the client application 138. The web search request may include one or more keywords describing a product, product category, etc. The web server 134 may relay the product search request to the search module 132, which may determines the search results (e.g., a set of products) based on the product search request (e.g., using the keywords), as described in further detail herein at least in reference to FIG. 3.

In block 206, the method 200 determines an expected financial gain, such as the expected profit and/or expected revenue, for all or some of products in the search results (e.g., the set of products). The expected financial gain computation for each product may be based on a purchase probability for that products and a margin and/or a price from a sale of the product. For example, the expected profit for a product could be calculated by the expected gain module 126 by multiplying the purchase probability by the profit margin. In some implementations, the expected gain module 126 may base the expected profit on a weight (e.g., as received from the weighting efficiency module 130 or the business objective data 144) for the profit, revenue, number of sales, etc., as described elsewhere herein at least in reference to 4-9B. It should be understood that the expected financial gain may be computed in advance and retrieved from storage (e.g., the data store 108) or may be computed in real-time, depending on the implementation.

In block 208, the method 200 (e.g., the search module 132) may sort the search results (e.g., set of products) by the expected financial gain associated with each of the products for which an expected financial gain was computed. This is advantageous as it increases the probability of a user selecting to purchase a product that produces a better financial gain (e.g., more revenue and/or profit) than if the set of products were sorted in a conventional way, such as by price or popularity.

For example, as depicted in the following table (Table 1), product A may have a lower margin and a higher purchase probability than product B, resulting in a higher expected profit and therefore higher or more viewable position in ordered set of search results. Similarly, product C may have the highest probability to buy, but the margin is low enough that the resulting expected profit is lower than that of either product A or product B. In this case, product C would be ordered in the least favorable position (e.g., last, lowest, etc.) of the three products A, B, and C. In should be understood that the expected profit is only an example of a financial gain and that the order could be based on other criteria, such as other outcomes (e.g., revenue, ratio of profit to revenue, profit beyond a minimum amount and a maximum of revenue, etc.) or total sales (e.g., increase in market share).

TABLE 1

| Product | Margin | Purchase Probability | Expected Profit |
| --- | --- | --- | --- |
| A | $30 | 10% | $3.00 |
| B | $50 | 5% | $2.50 |
| C | $10 | 20% | $2.00 |

In some implementations, the search module 132 may provide for exceptions to the order above for certain purposes. For instance, a merchant may wish to specifically promote a particular product (e.g., inject a product in a certain position in the order of a set of products) due to an agreement with the product manufacturer, for example. In this case, the merchant may specify, via an administrator interface presented via the client application 138 on his/her client device 1306, the parameters for positioning the product information of that product within the search results, and data reflecting that positioning may be stored as product data 142 by the e-commerce server 1322 in the data store 210, for use by the search module 132 when sorting the results. In a further example, the search module 132 may include (e.g., according to an exception) a product earlier in the order of a set of products to experimentally determine the purchase probability for the product. For example, the search module 132 may sort a product to be first in order, so that a greater number of users will view the product page associated with the product and data can be gathered regarding the frequency with which those page views are converted into sales.

In block 210, the method 200 provides the ordered search results (e.g., set of products) to the client application 138 for display on the client device 1306 to the user. For instance, the search module 132 may provide the ordered results to the web server 134, which may generate a response including the search results and transmit the response (e.g., using a known protocol and format) via the network 1302 to the client device 1306 for processing and display by the client application 138. Block 210 is described in further detail herein at least in reference to FIG. 6.

Figure 3:
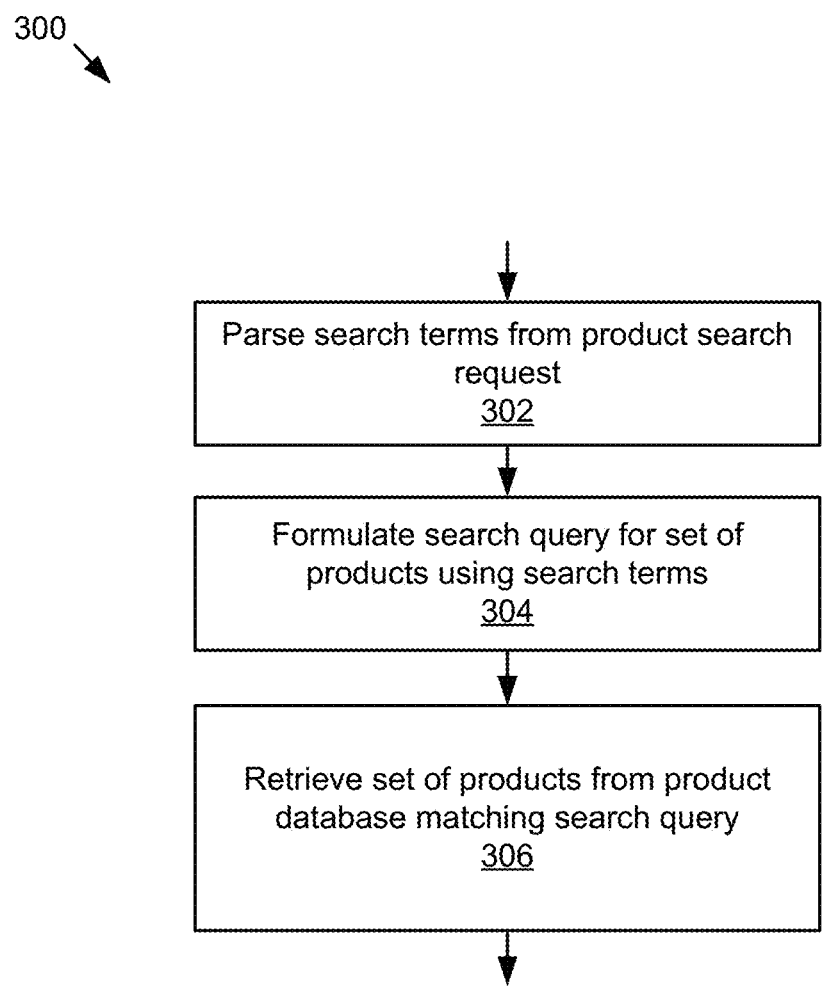
FIG. 3 is a flowchart illustrating an example method for determining search results based on a product search request.

FIG. 3 is a flowchart of an example method 300 for determining search results based on a product search request. In block 302, the search module 132 parses search terms from the product search request as received from the web server 134. In block 304, the search module 132 formulates a search query for one or more products (e.g., as set of products) using the search terms. In block 306, the search module 132 retrieves a set of products from a product database, which match the search query/terms.

Figure 4:
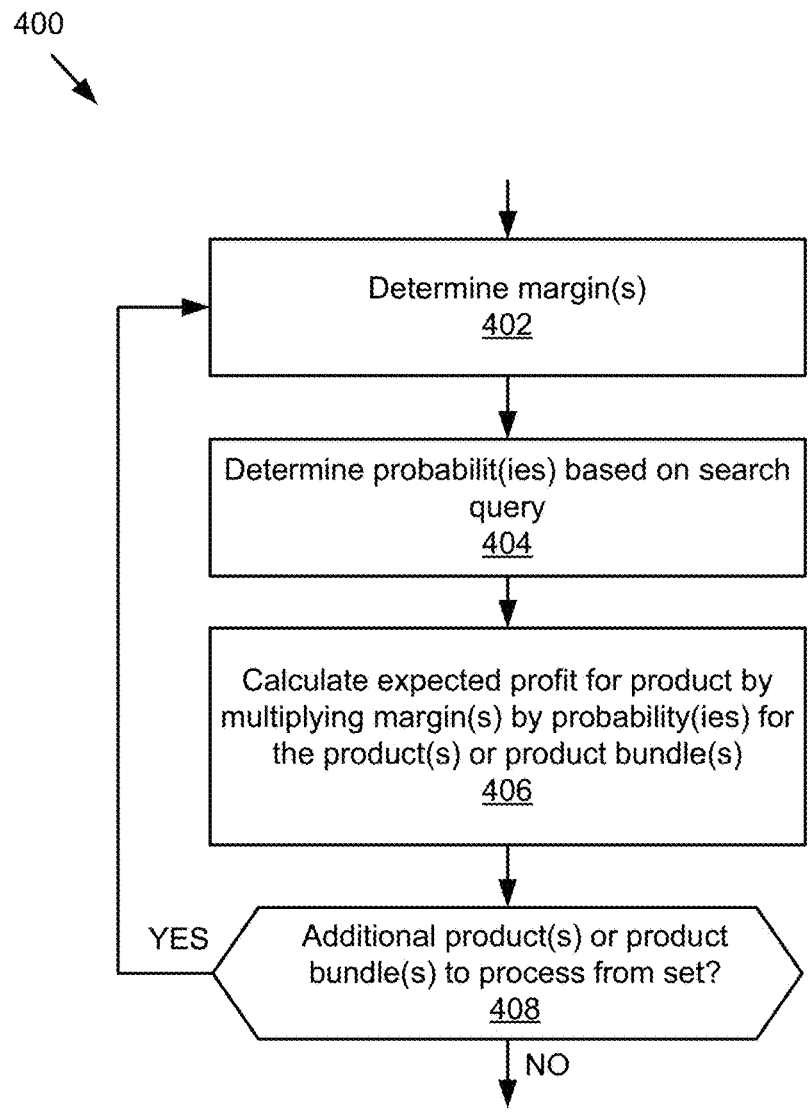
FIGS. 4 and 5 are flowcharts illustrating example methods for determining expected profit and expected revenue, respectively.
Figure 5:
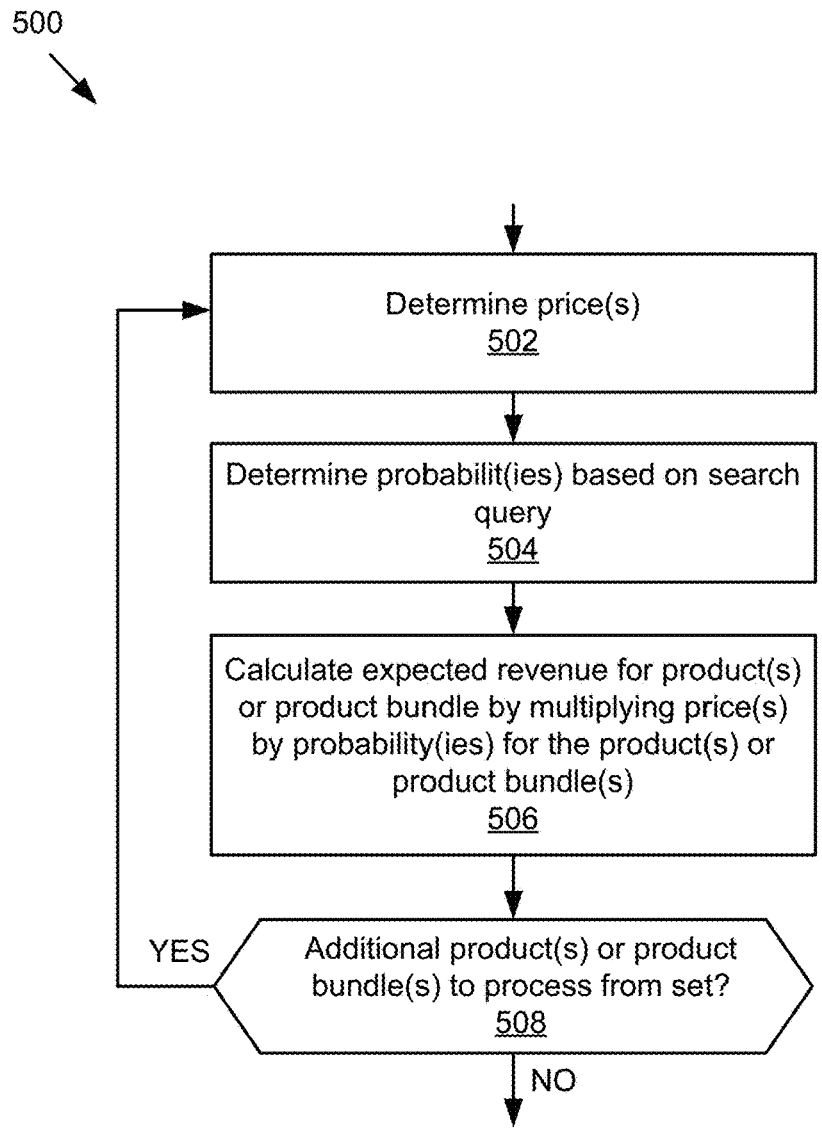

FIGS. 4 and 5 are flowcharts of example methods 400 and 500 for determining expected profit(s) and expected revenue(s) for product(s), respectively. With reference to FIG. 4, in block 402, the expected gain module 126 retrieves price data 146 including a margin for the product from the data store 108 (e.g., using a product ID). In some implementations, the expect profit module 126 calculates the margin based on a current sale price (e.g., retail price, sales price, discounted price, etc.) of the product less the cost of goods (e.g., the cost of the product to the company) for the product, as reflected by the price data 146 for the product, which may be retrieved from the data store 108. With reference to FIG. 5, in block 502 the expected gain module 126 determines the price of the product, such as a sale or retail price. In some implementations, the expected gain module 126 retrieves price data 146 including the price from the data store 108 (e.g., using a product ID).

In blocks 404 and 504, the purchase probability module 124 determines the purchase probability for the product as described elsewhere herein.

In block 406, the expected gain module 126 calculates the expected profit for the product by multiplying the margin for the product by the purchase probability for the product (or, for example, a set of products, such as a product bundle). In block 506, the expected gain module 126 calculates the expected revenue for the product by multiplying the price of the product by the purchase probability for the product.

In some implementations, the expected gain module 126 can calculate a weighted expected gain (e.g., expected profit and weighted expected revenue) to reflect their proportionate (e.g., the ratio) importance in the company's pricing strategy. For example, the expected gain module 126 can calculate a weighted expected gain by applying a weight to each of the profit and revenue (and/or the total number of sales, in some implementations). The weighted expected gain can be calculated using the relationship $E=P*(A*m+B*p)$, where E is the expected gain, P is the probability to purchase the product (e.g., when the current search string is used), A is the profit weight, m is the margin, B is the revenue weight, and p is the price. These weighting factors are described in further detail elsewhere herein at least in reference to FIGS. 7-9B.

In blocks 408 and 508, the expected gain module 126, the search module 132, or another component determines whether there are additional products to process and processes them accordingly.

In some implementations, in order to improve computational efficiency, the method 400 or 500, as the case may be, may cease to determine the expected gains for products past a certain threshold. For example, the threshold may be set to be the number of products matching the first X (e.g., one, two, etc.) webpages of search results. In another example, the threshold may be products with less than a certain predetermined purchase probability. If the result of blocks 408 or 508 is positive, the applicable method 400 or 500 may start over again with a subsequent product at blocks 402 and 502, respectively. If the result of blocks 402 and 502 is negative, the respective method 400 or 500 may end. The methods 400 and 500 may either store their outputs in the data store 108 iteratively or upon completion of all products and/or send the outputs to other components of the search engine 120, such as the search module 132 or the web server 134.

Figure 6:
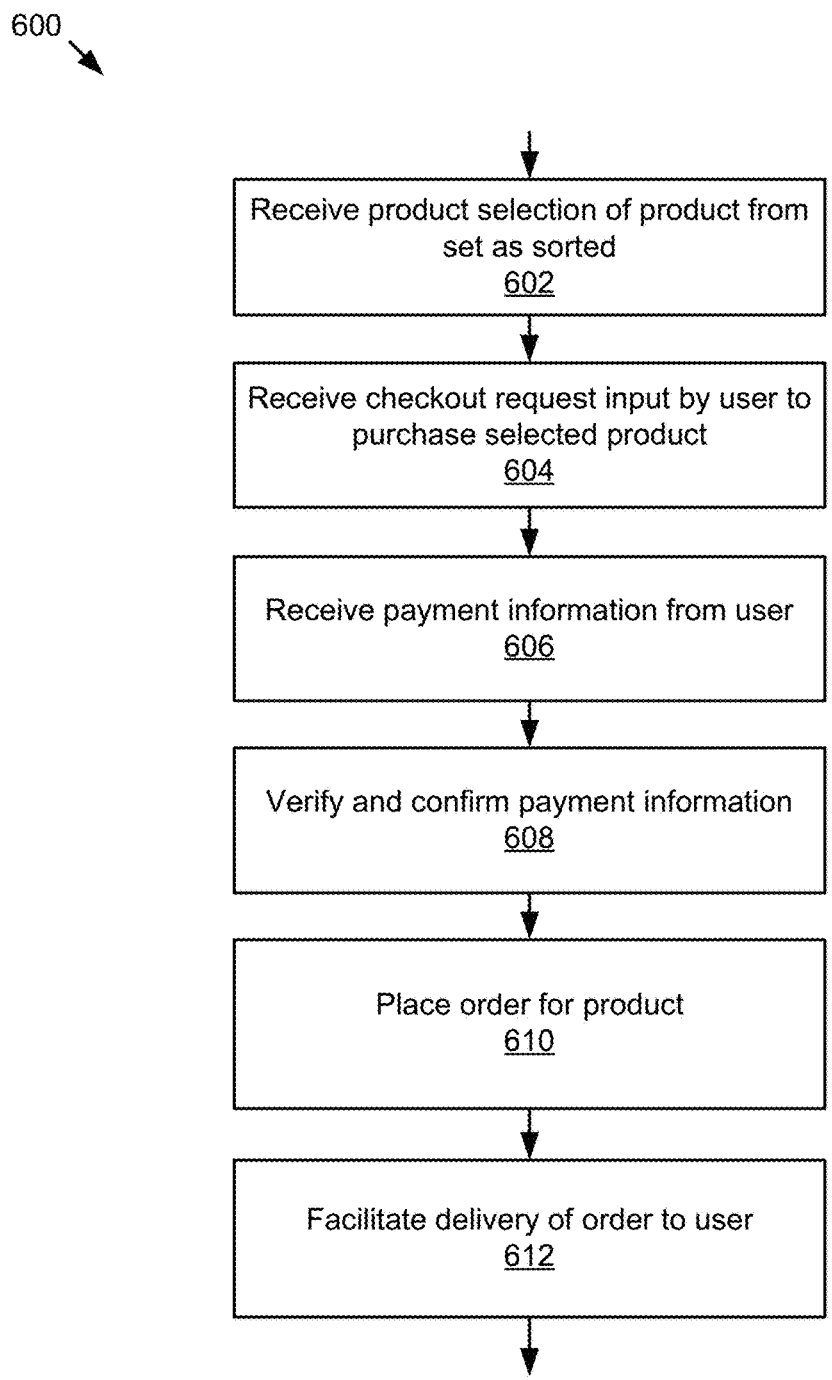
FIG. 6 is a flowchart illustrating an example method for facilitating the purchase and fulfillment of a product.

FIG. 6 is a flowchart of an example method 600 for facilitating the purchase and fulfillment of a product. In block 602, the e-commerce application 136 receives a product selection of a product from the set as sorted by the search module 132. In block 604, the e-commerce application 136 receives a checkout request input by a user to purchase the selected product (e.g., after viewing the product page, upon selecting the product from the search results, etc.). In block 606, the e-commerce application 136 receives payment information from the user. In block 608, the e-commerce application 136 verifies and confirms the payment information. In block 610, the e-commerce application 136 places an order for the product. For instance, the e-commerce application 136 authorizes the order for fulfillment, by storing record of such in the data store 108. In block 612, the e-commerce application 612 facilitates delivery of the order to the user (e.g., by sending the order to an order fulfillment facility or local store).

Figure 7:
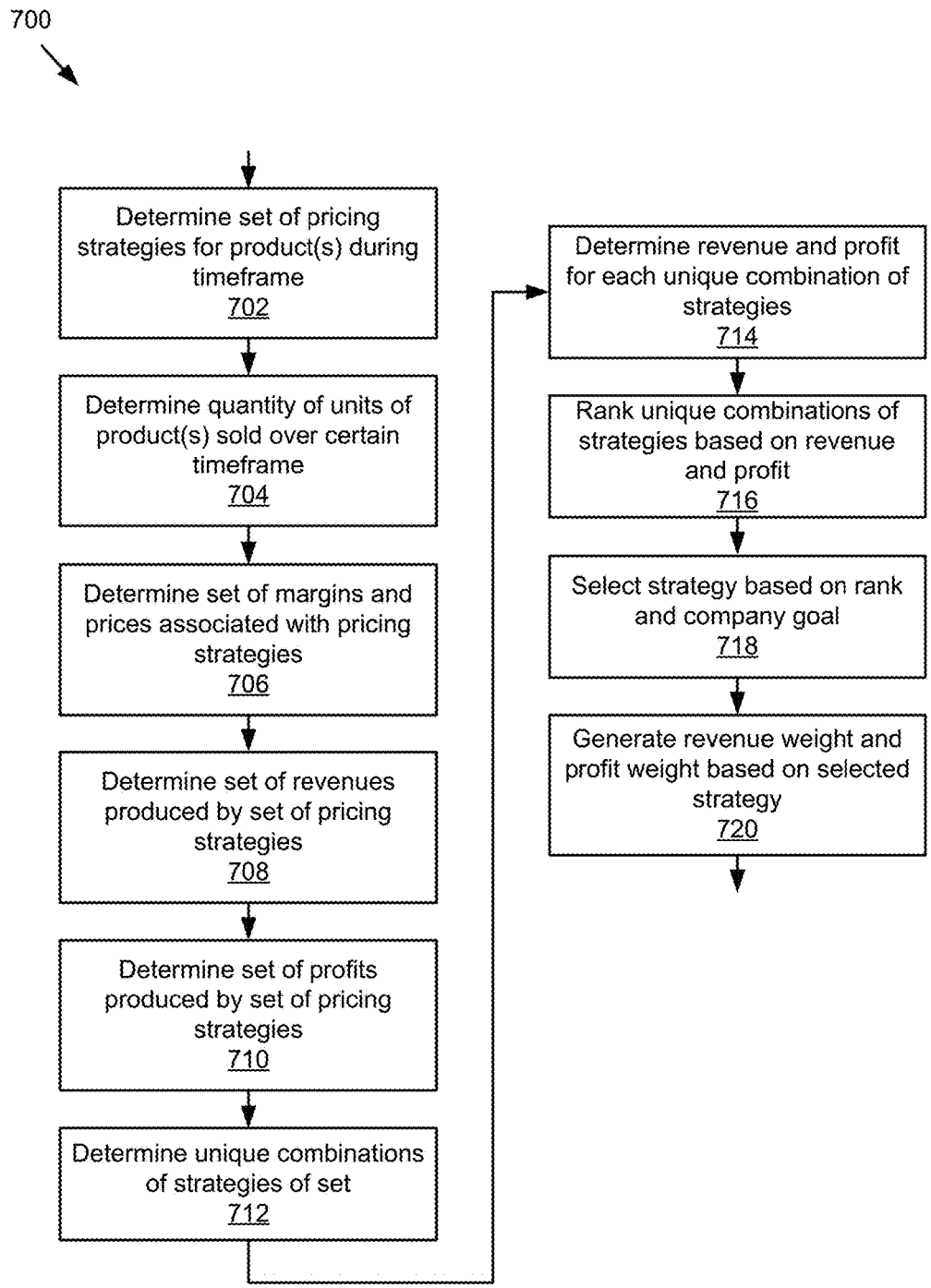
FIG. 7 is a flowchart illustrating an example method for computing an expected profit based on probability, revenue weight, price, profit weight, and margin.

FIG. 7 is a flowchart of an example method 700 for computing an expected profit based on probability, revenue weight, price, profit weight, and margin.

In block 702, the weighting efficiency module 130 determines a set of pricing strategies for product(s) during a certain timeframe (e.g., any number of hours, days, etc.). In block 704, the weighting efficiency module 130 determines a quantity of units of product(s) sold over the certain timeframe. For example, the weighting efficiency module 130 may determine pricing strategies for products (e.g., prices of products, incentives applied to products, discounts on products, etc.) and track the effect of those pricing strategies over the timeframe and/or a group of customers (e.g., a sampling of a certain percentage of customers viewing a product page may receive an incentive, which has an effectiveness tracked by the weighting efficiency module 130). In some implementations, a pricing strategy may be applied to a specific product, a group of products, or globally across an inventory. For example, a company may apply a 15% discount on all paper, a 10% discount on all ink, and/or a 20% discount on all HP brand products.

In block 706, the weighting efficiency module 130 determines a set of margins and a set of prices associated with each of the pricing strategies. The margins and prices may be retrieved from the data store 108, calculated based on the cost of goods and the sales price of the product, as described elsewhere herein. In block 708, the weighting efficiency module 130 determines a set of revenues produced by the set of pricing strategies, and in block 710, it determines a set of profits produced by the set of pricing strategies. For example, a pricing strategy for a product or group of products could be that those products receive a certain discount, which the weighting efficiency module 130 uses to calculate a profit and/or a revenue for that product or group of products. An illustrative example of pricing strategies and their effects can be seen in FIGS. 8A and 8B.

FIG. 8A is a table 800 depicting a set of example pricing strategies for an example product #1. In particular, the table 800 shows a set of pricing strategies 802 (also labeled as strategy 0), 804 (also labeled as strategy 1), and 806 (also labeled as strategy 2). In the depicted example, strategy 802 includes zero product discount, strategy 804 includes a product discount of $1, and strategy 806 includes a product discount of $2. The pricing strategies 802, 804, and 806 show the sales price, the quantity sold, the margin, the total revenue (the quantity sold multiplied by the price), and the total profit (the quantity sold multiplied by the product margin). As shown in the table 800, while the price of pricing strategy 804 is lower than the price in pricing strategy 802, the total profit and revenue is higher for 804. Similarly, the price in strategy 806 is lower than for strategy 804, but strategy 806 doesn't sufficiently increase the quantity sold to compensate and thus produces a lower total revenue and total profit than strategy 804.

FIG. 8B is a table 830 depicting a set of example pricing strategies for an example product #2. In particular, the table 830 shows a set of pricing strategies 832 (also labeled as strategy 0) and 834 (also labeled as strategy 3). In the depicted example, strategy 832 is a pricing strategy with zero discount and strategy 834 has a discount of $10. As shown in the table 830, the pricing strategy 834 results in a greater revenue, but not a greater profit than the pricing strategy 832. Thus, the pricing strategy 832 produces a greater total profit and the pricing strategy 834 produces a greater total revenue.

Returning to FIG. 7, in block 712 the weighting efficiency module 130 may determine unique strategy combinations for the set of pricing strategies (e.g., unique combinations of two or more pricing strategies). In 714, the weighting efficiency module 130 determines a total revenue and a total profit for each strategy combination of the set.

FIG. 8C is a table 860 depicting an example of a set of strategy combinations for product #1 and product #2. In particular, the table 860 shows a set of unique strategy combinations 866 of the pricing strategies from product #1 shown in FIG. 8A and product #2 shown in FIG. 8B. The strategy combinations 866 are labeled 0, 1, 2, 3, 4, and 5, to reflect the combinations as shown in the table 860. As shown in the table 860, some combinations result in higher total combined profits while others result in higher total combined revenues. Other strategy combinations are possible including those of more than two or more different products, a set of products (e.g., product bundles), etc. Due to the large quantity of products available in some inventories, it may be impracticable to determine all unique combinations of pricing strategies, thus pricing strategies can be may be combined using a predetermined classifying scheme or may be randomly defined.

Figure 9A:
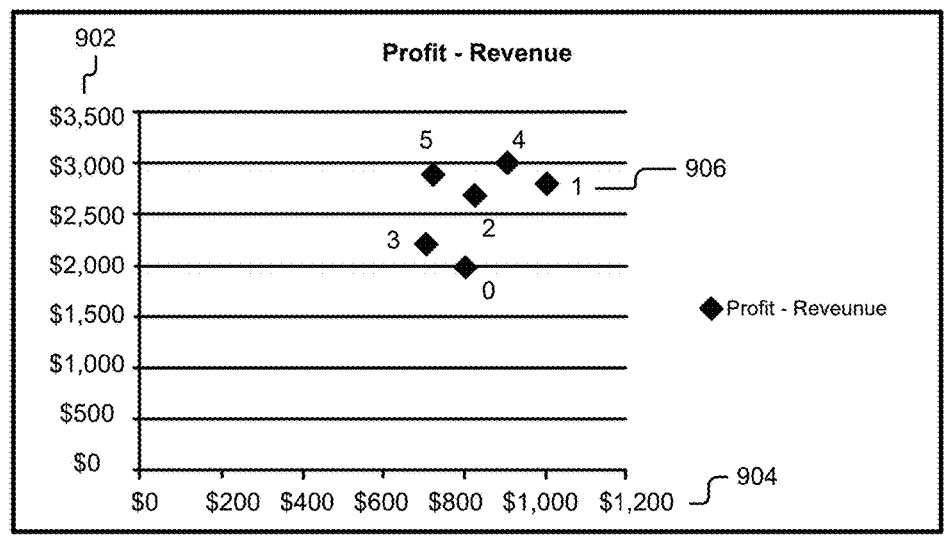
FIGS. 9A and 9B are graphs illustrating example efficient frontiers.
Figure 9B:
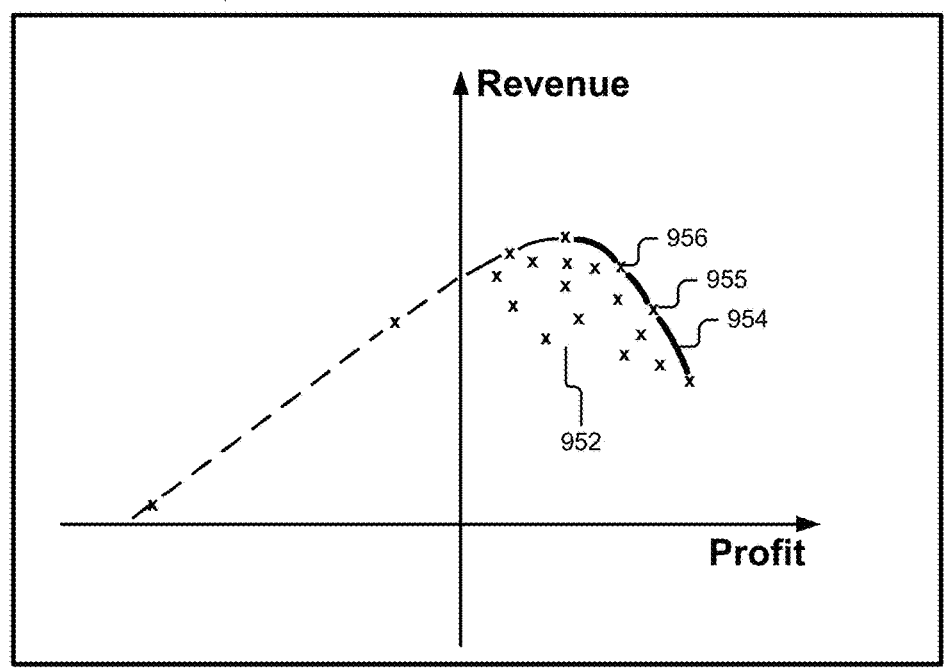

Returning to FIG. 7, in block 716, the weighting efficiency module 130 ranks unique combinations of strategies based on revenue and profit. While the strategy combinations can be ranked along either revenue or profit, they can both be ranked when performing the ranking in multiple (e.g., two) dimensions. An example ranking in two dimensions (revenue and profit) is illustrated in FIGS. 9A and 9B. The ranking can be stored by the weighting efficiency module 130, for example, as business objective data 144 in the data store 108.

FIG. 9A is an example graph 900 of data points 906 (0, 1, 2, 3, 4, 5), which correspond to the strategy combinations 866 shown in table 860. The vertical axis 902 of the graph 900 shows total combined revenue for the strategy combinations and the horizontal axis 904 shows the total combined profit. The strategy combinations 0-5 illustrate that certain strategies are more desirable than other strategies, regardless of whether a company goal is to maximize revenue, profit, or a combination thereof. For example, the strategy combination 4 will result in both a higher profit and revenue than the strategy combination 2.

As depicted, the strategy combination 4 maximizes revenue and the strategy combination 1 maximizes profit, so the weighting efficiency module 132 must determine which strategy combination to select based on a predetermined company goal. The merchant's goal may be predefined (e.g., previously input by an administrator) based on the strategy combination data points in the efficient frontier, as discussed in reference to FIG. 9B. It should be understood that other implementations are possible, such as ranking pricing strategies and/or strategy combinations together, separately, or alternatively.

FIG. 9B is an example graph 950 including data points 952 reflecting pricing strategies (and/or combinations thereof). In particular, the graph 950 reflects an efficient frontier 954 including optimal points 955-956. Like the data points in FIG. 9A, the data points 952 reflect various pricing strategies (and/or strategy combinations) which are not the most efficient strategies in the set. The efficient frontier 954 is an example of a Pareto frontier, which includes a set of points that are Pareto efficient (the most efficient possibility along a given within a certain range of values). For example, the strategy combination 1 in graph 900 is Pareto efficient for profit and the point 4 is Pareto efficient for revenue. The efficient frontier represents all optimal strategies that can be selected. The points from the efficient frontier 954 are optimal; that is, one cannot find a strategy with a higher profit without decreasing the revenue and vice versa. The strategies represented by data points 952 are not optimal; that is, there is a strategy with a higher revenue and the same profit and there is also a strategy with a higher profit and the same revenue. In general the strategies represented by data points 952 can be improved in both revenue and profit.

Returning to FIG. 7, in block 718, the weighting efficiency module 130 selects a strategy based on the rank and a predetermined objective (e.g., a target profit margin and/or revenue, other company financial goal). In some implementations, the weighting efficiency module 130 retrieves the predetermined objective and a set of pricing strategies and/or strategy combinations from the data store 108, and uses the objective to select a strategy or strategy combination along the efficient frontier. In some instances, the selection of the objective uses Pareto multi-objective optimization.

In block 720, the weighting efficiency module 130 generates a revenue weight and profit weight based on the selected strategy. In some implementations, the revenue weight and profit weight may be represented by a vector. For example, if the selected strategy corresponds to point 4 on the graph 900, then the vector would be (900, 3000) or (0.287, 0.958) as normalized (e.g., $$(e.g., 0.287 = \frac{900}{\sqrt{900^2 + 3000^2}}),$$

indicating that the profit weight should be 0.287 when the revenue weight is 0.958. In further implementations, the vector and the weights may be non-normalized.

In a further related example the expected gain module 126 may computes the expected gain (e.g., the expected profit and/or expected revenue) for a product (e.g., from the set of products) based on the purchase probability, revenue weight, price, profit weight, and margin. In some implementations, the expected gain module 126 retrieves the purchase probability, revenue weight, price, profit weight, and margin from the data store 108 or another component of the search engine 120, as discussed elsewhere herein.

The total expected gain (e.g., as a combination or ratio of revenue and profit) may, in some instances, be calculated using the relationship $E=P*(A*m+B*p)$, as described elsewhere herein. Using the example profit weight of $A=0.287$ and revenue weight of $B=0.958$ discussed above in reference to FIG. 720, and if, for example, a product has a purchase probability $P=0.3$, a margin $m=\$20$, and a price $p=\$80$, then in this example the total expected gain (also sometimes referred to herein as the weighted expected gain) for that product would be $E=P*(A*m+B*p)=0.3*(0.287*\$20+0.958*\$80)=\$24.71$.

In some implementations, the operations described with reference to blocks 702-720 serve as preprocesses for other methods, such as but not limited to various operations of the methods 200-600 described with reference to FIG. 2-6, respectively. For instance, the output from the method 700 (as described in reference to blocks 702-720) (e.g., a profit weight and a revenue weight) may be used by the search module 132, as discussed elsewhere herein. This output may be less subject to change (e.g., responsive to a change in business strategy/company goal), and as such, the method 700 and/or operations thereof may be executed on a less frequent basis than the various operation(s) of the methods 200-600. For instance, the various operations of the methods 200-600 may be executed responsive to search requests which may occur much more frequently (e.g., thousands of times per day, minute, etc.).

FIG. 10 is an example graphical user interface 1000 showing set of search results including products 1002 ordered using conventional means (e.g., from least expensive to most expensive).

FIG. 11 is an example graphical user interface 1100 showing set of products ordered to maximize a financial gain (e.g., expected profit and/or revenue), as discussed in the present disclosure. In this figure, a customer entered the keyword laptop into a search box 1106 and submitted a product search request for corresponding products, which the search engine 120 received (e.g., via the web server 134) and processed, as discussed herein. Responsive to the search request, search results 1108 including a uniquely ordered set of products ordered is displayed by the client application 138 via the interface 1100. More particularly, the product 1102 is placed first in the order because the expected profit and/or revenue associated with it is higher than that of the product 1104, despite the fact that the final price of the product 1104 is higher than the final price of the product 1102.

FIG. 12 is an example graphical user interface 1200 that shows search results including a set of product bundles retrieved in response to the product search request discussed in reference to FIG. 11. A bundle of two or more products may be considered as a new product and the technique described above may be used to determine its order in search results. In this example, the product bundle 1202 is placed first in the order because the expected gain of that product bundle is higher than that of the product bundle 1204. The order of the results in interface 1200, which include some of the same products as those depicted in the interface 1100, is different form the order in interface 1100 because the effect on the expected gains produced from the bundling of the products (e.g., changing the total profit, revenue, and/or purchase probability). It should be understood that the interfaces 1100 and 1200 discussed herein are provided for illustration purposes and should not be considered limiting, as numerous other configurations, including different looks and feels, products, product combinations, interface types, and other aspects are possible, contemplated, and encompassed by this disclosure.

FIG. 13 is a block diagram of an example system 1300 for ordering search results to maximize an expected gain. The illustrated system 1300 may include a client device 1306a . . . 1306n (also referred to herein individually and/or collectively as 1306), a third-party server 1318, and an e-commerce server 1322, which are electronically communicatively coupled via a network 1302 for interaction with one another, although other system configurations are possible including other devices, systems, and networks. For example, the system 1300 could include any number of client devices 1306, third-party servers 1318, e-commerce servers 1322, and other systems and devices. The client devices 1306a . . . 1306n, and their components, may be coupled to the network 1302 via signal lines 1312a . . . 1312n. The e-commerce server 1322 and its components may be coupled to the network 1302 via signal line 1320. The third-party server 1318 and its components may be coupled to the network 1302 via signal line 1316. The users 1314a . . . 1314n may access one or more of the devices of the system 1300. For example, as depicted, a user 1314a may access and/or interact with the client device 1306a as illustrated by line 1312a, a user 1314b may access and/or interact with the client device 1306b as illustrated by line 1312b, and a user 1314n may access and/or interact with the client device 1306n as illustrated by line 110n.

The network 1302 may include any number of networks and/or network types. For example, the network 1302 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 1306 includes one or more computing devices having data processing and communication capabilities. The client device 1306 may couple to and communicate with other client devices 1306 and the other entities of the system 1300 via the network 1302 using a wireless and/or wired connection. Examples of client devices 1306 may include, but are not limited to, mobile phones, tablets, laptops, desktops, netbooks, server appliances, servers, virtual machines, TVs, etc. The system 1300 may include any number of client devices 1306, including client devices of the same or different type.

A plurality of client devices 1306a . . . 1306n are depicted in FIG. 13 to indicate that the e-commerce server 1322 and its components may aggregate information about and provide optimized price discounts to a multiplicity of users 1314a . . . 1314n on a multiplicity of client devices 1306a . . . 1306n. In some implementations, a single user may use more than one client device 1306, which the e-commerce server 1322 may track and aggregate interaction data associated with the user, which the search engine 120 may use to performs its acts and/or functions as discussed elsewhere herein. Users may have different habits based on the device they are on, and the e-commerce server 1322 can determine those habits and produce a more optimized experience to the user.

The e-commerce server 1322 may include an instance of the search engine 120 (the instances of the search engine 120a . . . 120n may be referred to herein independently and/or collectively as 120). In some configurations, the search engine 120 may be distributed over the network 1302 on disparate devices in disparate locations or may reside on the same locations, in which case the client device 1306a and/or the e-commerce server 1322 may each include an instance of the search engine 120. The client devices 1306 may also store and/or operate other software such as a client application 138, an e-commerce application 136, operating system, other applications, etc., that are configured to interact with the e-commerce server 1322 via the network 1302.

The e-commerce server 1322 and the third-party server 1318 have data processing, storing, and communication capabilities, as discussed elsewhere herein. For example, the servers 1322 and/or 1318 may include one or more hardware servers, server arrays, storage devices and/or systems, etc. In some implementations, the servers 1322 and/or 1318 may include one or more virtual servers, which operate in a host server environment. As depicted, the e-commerce server 1322 may include an e-commerce application 136, the search engine 120, and a web server 134, as discussed elsewhere herein.

Third-party server 1318 can host services such as a third-party application (not shown), which may be individual and/or incorporated into the services provided by the e-commerce server 1322. In some implementations, the third-party application provides additional acts and/or information such as browsing history, tracking information, profile data, shopping data, competitive pricing, competitive offers, web analytics, etc., to the e-commerce server 1322 for storage in the data store 108, which is further described in reference to FIG. 2.

It should be understood that the system 1300 illustrated in FIG. 13 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method performed by one or more computing devices, the method comprising:
  displaying, at a display device to a user, a graphical user interface including a search region;
  receiving, at an input device using the graphical user interface, input from the user including one or more keywords;
  generating, using the one or more computing devices, a product search request based on the one or more keywords;
  retrieving, using the one or more computing devices, a set of products from a product database based on the product search request;
  determining, using the one or more computing devices, a subset of products of the set of products including:
    for each product in the set of products,
      tracking, using the one or more computing devices, user interactions with a product page associated with the product of the set of products using analytics data from web server logs, the user interactions representing a number of users who viewed the product page;
      determining, using the one or more computing devices, a quantity of users who purchased the product via the product page; and
      determining, using the one or more computing devices, a purchase probability for the product based on a percentage of views of the product page associated with the product which are converted into sales, the percentage of views of the product page being calculated based on the tracked user interactions with the product page and the quantity of users who purchased the product via the product page; and
    determining, using the one or more computing devices, the subset of products based on a threshold quantity of products and the purchase probability of each product of the set of products;

generating, using the one or more computing devices, sorting criteria including revenue weight, profit weight, expected revenue, and expected profit associated with each product of the set of products, generating the sorting criteria including:
  determining, using the one or more computing devices, a margin for each of the subset of products;
  determining, using the one or more computing devices, a price for each of the subset of products;
  computing, using the one or more computing devices, the expected profit associated with each product of the subset of products based on the purchase probability and the margin of that product;
  computing, using the one or more computing devices, the expected revenue associated with each product of the subset of products based on the purchase probability and the price of that product; and
  generating, using the one or more computing devices, the revenue weight and the profit weight based on a predetermined objective and a ranking of a set of pricing strategies associated with the products of the subset of products;
sorting, using the one or more computing devices, the subset of products into an ordered set of products having an order based on the sorting criteria associated with each product of the subset of products, the ordered set providing for an exception to the order of the ordered set based on a defined setting, the exception including that an excepted product is sorted in a different position than that specified by the order; and
displaying, in the graphical user interface, graphical elements formatting the ordered set of products as search results such that the excepted product is in the different position relative to one or more other products of the ordered set in the graphical user interface.

2. The computer-implemented method of claim 1, wherein generating the revenue weight and the profit weight includes:
  determining, using the one or more computing devices, a set of product pricing strategies for a certain timeframe;
  determining, using the one or more computing devices, a quantity of products sold over the certain timeframe using each of the product pricing strategies;
  determining, using the one or more computing devices, a profit produced by each of the product pricing strategies;
  determining, using the one or more computing devices, a revenue produced by each of the product pricing strategies;
  determining, using the one or more computing devices, strategy combinations for the set of product pricing strategies;
  ranking, using the one or more computing devices, the strategy combinations based on combined profit and combined revenue produced by each of the strategy combinations; and
  generating, using the one or more computing devices, the revenue weight and the profit weight based on the ranked strategy combinations and a predetermined objective.

3. The computer-implemented method of claim 1, wherein determining the purchase probability for each of the products of the set is based on a specificity of the product search request.

4. A computer-implemented method performed by one or more computing devices, the method comprising:
  displaying, at a display device to a user, a graphical user interface including a search region;
  receiving, at an input device using the graphical user interface, input from the user including one or more keywords;
  generating a product search request based on the one or more keywords;
  retrieving, using the one or more computing devices, a set of products from a product database based on the product search request;
  determining, using the one or more computing devices, a subset of products of the set of products including:
    for each product in the set of products,
      tracking user interactions with a product page associated with the product of the set of products using analytics data from web server logs, the user interactions representing a number of users who viewed the product page;
      determining a quantity of users who purchased the product via the product page; and
      determining, using the one or more computing devices, a purchase probability for the product based on a percentage of views of the product page associated with the product which are converted into sales, the percentage of views of the product page being calculated based on the tracked user interactions with the product page and the quantity of users who purchased the product via the product page; and
    determining, using the one or more computing devices, the subset of products based on a threshold quantity of products and the purchase probability of each product of the set of products;
  generating, using the one or more computing devices, sorting criteria including an expected financial gain for each of the products of the subset of products based on a purchase probability and one or more of a margin and a price for that product;
  sorting, using the one or more computing devices, the subset of products into an ordered set of products having an order based on the sorting criteria associated with each of the products, the ordered set providing for an exception to the order of the ordered set based on a defined setting, the exception including that an excepted product is sorted in a different position than that specified by the order; and
  displaying, in the graphical user interface, graphical elements formatting the ordered set of products such that the excepted product is in the different position relative to one or more other products of the ordered set in the graphical user interface.

5. The computer-implemented method of claim 4, wherein the expected financial gain is based on a combination of an expected profit for each product of the subset of products and an expected revenue for each product of the subset of products.

6. The computer-implemented method of claim 4, wherein the expected financial gain is based on a combination of an expected profit for each product of the subset and an expected revenue for each product of the subset, the combination includes a ratio based on a revenue weight and a profit weight, and determining the ratio comprises:
  determining, using the one or more computing devices, a set of product pricing strategies for a certain timeframe,
  determining, using the one or more computing devices, a quantity of products sold over the certain timeframe using each of the product pricing strategies, determining, using the one or more computing devices, a profit produced by each of the product pricing strategies, determining, using the one or more computing devices, a revenue produced by each of the product pricing strategies, ranking, using the one or more computing devices, the set of product pricing strategies based on the profit and the revenue produced by each of the product pricing strategies, and generating, using the one or more computing devices, the revenue weight and the profit weight based the ranked set of product pricing strategies and a predetermined objective.

7. The computer-implemented method of claim 6, further comprising determining, using the one or more computing devices, strategy combinations for the set of product pricing strategies, and wherein ranking the set of product pricing strategies includes ranking the strategy combinations and the set of product pricing strategies based on the profit and the revenue produced by each of the product pricing strategies and a combined profit and combined revenue produced by each of the strategy combinations, and generating the revenue weight and the profit weight is further based on the ranked strategy combinations.

8. The computer-implemented method of claim 7, wherein ranking the strategy combinations further comprises determining an efficient frontier including the strategy combinations.

9. The computer-implemented method of claim 4, wherein the defined setting includes an administrator setting.

10. The computer-implemented method of claim 4, wherein the purchase probability is determined for each product of the set of products.

11. The computer-implemented method of claim 10, further comprising determining, using the one or more computing devices, the purchase probability for each of the set of products based on a specificity of the product search request.

12. A system comprising:
one or more processors;
one or more memories storing instructions that, when executed by the one or more processors, cause the system to perform acts including:
displaying, at a display device to a user, a graphical user interface including a search region;
receiving, at an input device using the graphical user interface, input from the user including one or more keywords;
generating a product search request based on the one or more keywords;
retrieving, using the one or more computing devices, a set of products from a product database based on the product search request;
determining, using the one or more computing devices, a subset of products of the set of products including:
for each product in the set of products,
tracking user interactions with a product page associated with a product of the set of products using analytics data from web server logs, the user interactions representing a number of users who viewed the product page;
determining a quantity of users who purchased the product via the product page; and
determining, using the one or more computing devices, a purchase probability for one or more products in the set of products based on a percentage of views of the product page associated with the one or more products which are converted into sales, the percentage of views of a product page being calculated based on the tracked user interactions with the product page and the quantity of users who purchased the product via the product page; and
determining, using the one or more computing devices, the subset of products based on a threshold quantity of products and the purchase probability of each product of the set of products;
generating, using the one or more computing devices, sorting criteria including an expected financial gain for each of the products of the subset of products based on a purchase probability and one or more of a margin for that product and a price for that product;
sorting, using the one or more computing devices, the subset of products into an ordered set of products having an order based on the sorting criteria associated with each of the products, the ordered set providing for an exception to the order of the ordered set based on a defined setting, the exception including that an excepted product is sorted in a different position than that specified by the order; and
displaying, in the graphical user interface, graphical elements formatting the ordered set of products such that the excepted product is in the different position relative to one or more other products of the ordered set in the graphical user interface.

13. The system of claim 12, wherein the expected financial gain is based on a combination of an expected profit for each product of the subset of products and an expected revenue for each product of the subset of products.

14. The system of claim 12, wherein the expected financial gain is based on a combination of an expected profit for each product of the subset of products and an expected revenue for each product of the subset of products, the combination includes a ratio based on a revenue weight and a profit weight, and determining the ratio comprises:
determining, using the one or more computing devices, a set of product pricing strategies for a certain timeframe,
determining, using the one or more computing devices, a quantity of products sold over the certain timeframe using each of the product pricing strategies,
determining, using the one or more computing devices, a profit produced by each of the product pricing strategies,
determining, using the one or more computing devices, a revenue produced by each of the product pricing strategies,
ranking, using the one or more computing devices, the set of product pricing strategies based on the profit and the revenue produced by each of the product pricing strategies, and
generating, using the one or more computing devices, the revenue weight and the profit weight based the ranked set of product pricing strategies and a predetermined objective.

15. The system of claim 14, further comprising determining, using the one or more computing devices, strategy combinations for the set of product pricing strategies, and wherein
ranking the set of product pricing strategies includes ranking the strategy combinations and the set of product pricing strategies based on the profit and the revenue produced by each of the product pricing strategies and a combined profit and combined revenue produced by each of the strategy combinations, and generating the revenue weight and the profit weight is further based on the ranked strategy combinations.

16. The system of claim 15, wherein ranking the strategy combinations further comprises determining an efficient frontier including the strategy combinations.

17. The system of claim 12, wherein the defined setting includes an administrator setting.

18. The system of claim 12, wherein the purchase probability is determined for each product of the set of products.

19. The system of claim 18, further comprising determining, using the one or more computing devices, the purchase probability for each of the set of products based on a specificity of the product search request.

* * * * *